United States Patent [19]
Nagatomo

[11] Patent Number: 5,904,043
[45] Date of Patent: May 18, 1999

[54] COMBINED MODE HYDROSTATIC TRANSMISSION

[75] Inventor: Kuniyasu Nagatomo, Fukuoka, Japan

[73] Assignees: Nagatomo Fluid Machinery Laboratory Ltd, Chikushino; Nissan Motor Co., Ltd., Yokohama, both of Japan

[21] Appl. No.: 08/929,796

[22] Filed: Sep. 15, 1997

[30] Foreign Application Priority Data

Sep. 15, 1996 [JP] Japan .................................. 8-279812

[51] Int. Cl.⁶ ............................................ F16D 31/02
[52] U.S. Cl. ................................... 60/435; 60/487
[58] Field of Search ........................ 60/435, 436, 437, 60/487

[56] References Cited

U.S. PATENT DOCUMENTS

| | | | |
|---|---|---|---|
| 2,996,135 | 8/1961 | Grabow | 60/435 X |
| 4,037,409 | 7/1977 | Leibach | 60/435 X |
| 5,367,877 | 11/1994 | Irikura | 60/435 |
| 5,497,622 | 3/1996 | Nam | 60/435 |
| 5,701,738 | 12/1997 | Eberle et al. | 60/435 |

FOREIGN PATENT DOCUMENTS 2563825  9/1996  Japan .

*Primary Examiner*—Hoang Nguyen
*Attorney, Agent, or Firm*—Foley & Lardner

[57] ABSTRACT

A combined mode hydrostatic transmission comprises a differential hydraulic motor and a variable capacity hydraulic pump for supplying this motor with pressurized oil. The differential hydraulic motor comprises a swash plate connected to an output shaft and a cylinder block joined to an input shaft. Further provided are a brake which selectively brakes the rotation of the cylinder block and a clutch which selectively interrupts the input rotation to the cylinder block. When the brake is operated and fluid is supplied from the variable capacity hydraulic pump with the clutch disengaged, the differential hydraulic motor functions in a HST mode. When the brake is released, the clutch is connected and fluid is supplied from the variable capacity hydraulic pump, the differential hydraulic motor functions in a HMT mode.

7 Claims, 9 Drawing Sheets

COMBINED MODE HYDROSTATIC TRANSMISSION

The contents of Tokugan Hei 8-279812, with a filing date of Sep. 15, 1996 in Japan, are hereby incorporated by reference.

FIELD OF THE INVENTION

The present invention relates to a transmission wherein a speed change ratio can be continuously varied, and more specifically to an improvement of a hydrostatic combined mode transmission making use of both mechanical functions and hydrostatic functions.

BACKGROUND OF THE INVENTION

One type of transmission known in the art in which a speed change ratio can be continuously varied, is a hydrostatic transmission (referred to hereafter as HST) comprising a variable capacity hydraulic pump and a variable capacity hydraulic motor.

This HST converts a motive force of an engine to a fluid flowrate and pressure by means of the variable capacity hydraulic pump, and transmits the output to the variable capacity hydraulic motor. The rotation of the motor can be controlled in a stepless fashion, including forward rotation, speed increase/decrease, backward rotation (i.e. rotation in a negative direction) and stop, by controlling the variable capacity hydraulic pump and the angle of a swash plate of the variable capacity hydraulic motor as shown in FIG. 7. Power is transmitted by a fluid flowing through an oil pressure pipe, so there is no mechanical restriction on the positions of the pump and motor, the disposition of these components relative to one another being a matter of free choice. For this reason, HST is widely used in construction machinery, for example.

However there is a problem with HST as regards power transmitting efficiency. As the power is transmitted by oil pressure, the transmitting efficiency is at most approximately 80%, and under normal partial load conditions, it is only of the order of 70–75%.

Further, to increase the speed of input rotation, the capacity of the variable capacity hydraulic motor must be decreased, but if the capacity is decreased, the oil pressure for the same load torque increases. In this case, the torque that can be used must also be controlled such that it decreases together with the rise of output rotation, and as a piston stroke has to be shortened to decrease the capacity, the efficiency also falls by a corresponding amount.

There is also a problem as regards the noise of the variable capacity hydraulic motor. The output rotation of HST is directly proportional to the rotation speed of the variable capacity hydraulic motor, i.e. to the piston speed, as shown in FIG. 8. Noise increases in direct proportion to the piston speed, consequently in the high rotation speed region noise increases, and more discomfort is caused by a rise of acoustic frequencies.

In addition to the aforesaid HST, there is also a mechanical-oil pressure transmission wherein transmission of the power is divided between a mechanical system and an oil pressure system, which is generally referred to as a hydromechanical transmission or HMT.

As one example of this, there is a combination of a differential gear device and HST which is used in driving aircraft generators, and an HMT is also proposed in Japanese Patent Publication (Tokkai Hei)1-250661.

According to this publication, power is transmitted not only by a fluid which has a large transmission loss, but also mechanically until certain conditions. The transmission efficiency is thereby increased. When the angle of the swash plate is in a neutral position, the piston stops, the rotation of the input axis and output axis coincide, and all the power is transmitted mechanically as shown in FIG. 10. The power transmission efficiency then reaches 95%. By controlling the angle of the swash plate, power of oil pressure is added, speed can be increased or decreased. Even when the output rotation speed is increased, a power transmission efficiency exceeding 90% is maintained and there is no variation of oil pressure for the same torque, which are major differences from an HST variable capacity hydraulic motor.

However, HMT has no functions to reverse the output rotation as shown in FIG. 9, and even when the rotation stops, the piston speed is a maximum in this stop position as shown in FIG. 10, so in practice it does not have a stable stop function.

Moreover, as it is required to mechanically transfer power from the input shaft to the output shaft, the positions of the input shaft and output shaft relative to one another are limited, and there is no design freedom as in the case of the input/output shafts of HST.

Further, the hydraulic pump on the input side and the hydraulic motor on the output side are connected not only mechanically but also hydrostatically. Consequently, it is not possible to make a connection to an external oil pressure line, and oil from the hydraulic pump cannot be used for other functions. In other words, as there is only one unique function, it is difficult to apply it to the case of construction machinery where it is required to share oil pressure lines.

HST permits free design, and vehicle wheels or the like may be directly fitted to final drive components. On the other hand, HMT has a low degree of freedom, is difficult to install in final drive components, and involves a more complex system than that of HST. For these reasons, the use of HMT is not so widespread.

SUMMARY OF THE INVENTION

It is therefore an object of this invention to provide a new combined mode hydrostatic transmission having the same reverse and stop functions as those of HST, and having a high power transmitting capacity in a medium speed/high speed speed increase region as in the case of HMT—i.e., an HST mode and an HMT mode.

This invention also provides a hydrostatic transmission wherein the output shaft has an unrestricted freewheeling function which is not present in HST and HMT.

This invention provides a hydrostatic transmission wherein, in particular, noise in the high speed rotation region is reduced.

This invention provides a hydrostatic transmission having a high degree of design freedom wherein the spatial relationship of an oil pressure pump and an oil pressure motor is not mechanically restricted.

This invention provides a hydrostatic transmission wherein an input shaft is not directly affected by an output torque, and wherein therefore, the strength of the input shaft side may be reduced.

This invention further provides a hydrostatic transmission of which the construction has been simplified.

In order to achieve the aforesaid objectives, this invention provides a combined mode hydrostatic transmission comprising a differential hydraulic motor and a variable capacity hydraulic pump for supplying pressurized oil to the motor. The motor comprises a swash plate joined in a one-piece construction to an output shaft supported free to rotate via a bearing relative to a casing, a cylinder block supported such that it is free to rotate coaxially with the output shaft via a bearing, wherein a plurality of pistons, which move forwards and backwards in each cylinder as they slide on the swash plate, are disposed on the same circle, and an input shaft is joined to the cylinder block in a one-piece construction, a change-over valve which changes over based on the relative rotation of the output shaft and the input shaft, and supplies a different fluid pressure to a port in a cylinder base in the cylinder according to whether the pistons are extending or contracting, a port block which connects a high pressure port and a low pressure port provided in the casing to the change-over valve even when the cylinder block is rotating, a clutch for selectively interrupting transmission of rotation from an external drive shaft to the input shaft, and a brake for selectively restricting or fixing the rotation of the cylinder block.

It is preferable that the brake comprises a plurality of friction plates connected to the inner circumference of the casing, a plurality of friction plates connected to the outer circumference of the cylinder block, and a piston which presses these friction plates together according to a control pressure.

It is further preferable that the clutch comprises a plurality of friction plates connected to the drive shaft, a plurality of friction plates connected to the input shaft, and a piston which presses these friction plates together according to a control pressure.

In this case, it is further preferable that the clutch is built into the casing.

It is further preferable that the drive shaft and the input shaft of the clutch are connected via an extensible shaft which may be freely lengthened or shortened in the axial direction, but fixed in the direction rotation and free joints disposed at the ends of this extensible shaft.

DESCRIPTION OF THE PREFERRED EMBODIMENTS

Figure 1:
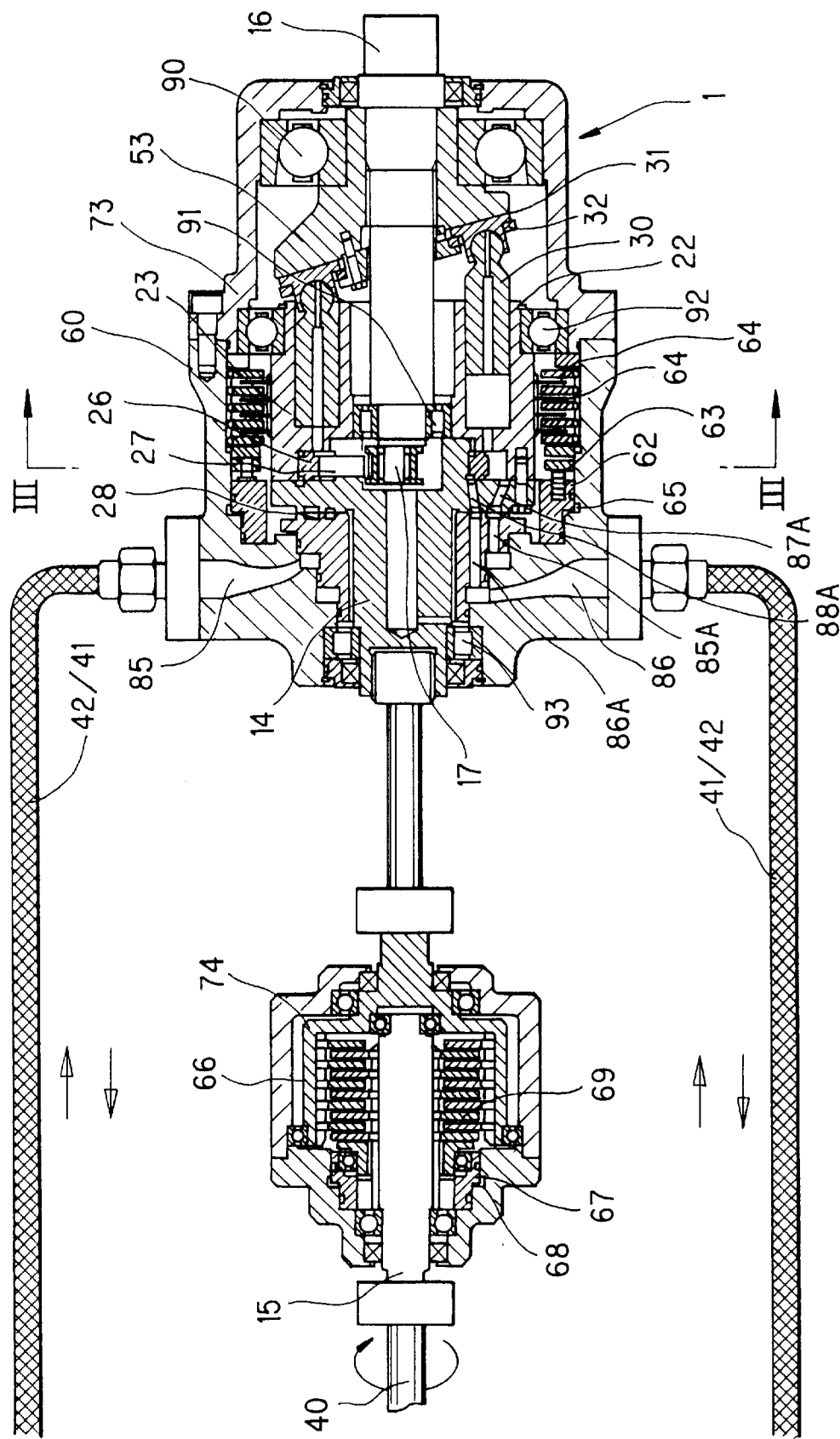
FIG. 1 is a view in vertical section of a differential hydraulic motor according to a first embodiment of this invention.

Referring to FIG. 1 of the drawings, a first output shaft 16 is supported free to rotate by bearings 90, 91 in a casing 73 of a differential hydraulic motor 1. A swash plate 53 is joined to this output shaft 16, and the two rotate together. An input shaft 14 is disposed coaxially with and on the opposite side to the output, shaft 16, and a cylinder block 22 is joined to the input shaft 14 in a one-piece construction. This input shaft 14 and cylinder block 22 are supported free to rotate relative to the casing 73 by bearings 92,93.

A plurality of pistons 30 are disposed free to slide in each cylinder in the cylinder block 22. The pistons 30 are disposed at equidistant intervals on ;la concentric circle relative to the rotation axis center of the cylinder block 22. The spherically rounded end of each piston 30 is connected with a slipper pad 32 of the swash plate 53 such that this end is free to move on a slant, the slipper pad 32 being fixed to a slide surface of the swash plate 53 by a retainer 31. When the piston 30 is pushed out by fluid pressure as described hereafter, the swash plate 53 is pushed so that it rotates relative to the cylinder block 22 due to a component force in the rotation direction. A port 23 is provided in the base of each cylinder in the cylinder block 22 to introduce or discharge the fluid acting on the piston 30.

The output shaft 16 extends toward the center part of the cylinder block 22, and an eccentric shaft 17 is formed in a one-piece construction at one of its ends. A plurality of drive rods 27 are radially disposed such that they come in contact with the outer circumference of the eccentric shaft 17. This drive rods 27 passes through part of the input shaft 14 such that it is free to slide in a radial direction, and comes in contact with the inner circumferential surface of a ring-shaped change-over valve 26. The ring-shaped change-over valve 26 is disposed in an annular space enclosed by the input shaft 14 and the cylinder block 22. When pushed by the drive rods 27, the change-over valve 26 moves eccentrically so as to connect the aforesaid port 23 to either an outer chamber 87 or an inner chamber 88 of the change-over valve 26. The change-over valve 26 is displaced according to a rotation angle difference between the output shaft 16 (eccentric shaft 17) and cylinder block 22, and returns to its original position after the output shaft 16 has performed one rotation relative to the cylinder block 22.

A part of the input shaft 14 comprises a port 87A which is constantly in contact with the outer chamber 87 and a port 88A which is constantly in contact with the inner chamber 88. An annular port block 28 situated on the outer circumference of the input shaft 14 is disposed free to slide in an axial direction inside the casing 73. End surfaces of ports 85, 86 provided in the casing 73 open out onto a step on the outer circumference of the port block 28, and passages 85A, 86A constantly connected to these ports 85, 86 pass through the port block 28 in an axial direction. These passages 85A, 86A remain connected to the ports 87A, 88A via an annular groove on an edge surface of the port block 28 even when the input shaft 14 rotates. The ports 85, 86 which are respectively on the fluid supply side and fluid discharge side are connected to the outer chamber 87 and inner chamber 88. These outer chamber 87 and inner chamber 88 are selectively connected to the port 23 of each cylinder by displacement of the change-over valve 26 so as to either supply or discharge fluid.

A spline groove extending in an axial direction is formed on the outer circumferential surface of the cylinder block 22. A plurality of ring-shaped friction plates 64 for braking are fitted into this groove. The plates 64 are joined together in the rotation direction of the cylinder block 22, and are free to slide in an axial direction. A spline groove is likewise formed on the inner circumferential surface of the casing 73. A plurality of ring-shaped friction plates 64 are also fitted into this groove such that they are free to slide in an axial direction in the same way as described above, thereby restricting motion in the rotation direction.

The friction plates 64 on the cylinder block side and casing side are alternately disposed relative to each other. A brake piston 62 is provided free to slide on the inner circumference of the casing 73. When a control pressure is exerted on the piston 62, the piston 62 presses the friction plates 64 so that the plates are pressed closely together, thereby braking the rotation of the cylinder block 22 which is restricted by the casing 73. When the control pressure is released, the piston 62 is pressed back by a return spring 63, thereby releasing the restriction on the cylinder block 22. These elements comprise a brake 60.

The input shaft 14 is selectively connected to an engine drive shaft 40 via a clutch 66. The clutch 66 comprises a plurality of spline-jointed friction plates 69 provided on the outer circumference of an input shaft 15, and a plurality of spline-jointed friction plates 69 are also provided on the inner circumference of a drum 74 situated outside these elements. When a piston 67 displaces due to a control pressure supplied to an oil pressure port 68, these friction plates 69 are pressed closely together so that the clutch 66 is engaged. Conversely, when the control pressure is released, the piston 67 is pressed back by a return spring, the friction plates 69 separate from each other and the clutch 66 is disengaged.

Figure 2:
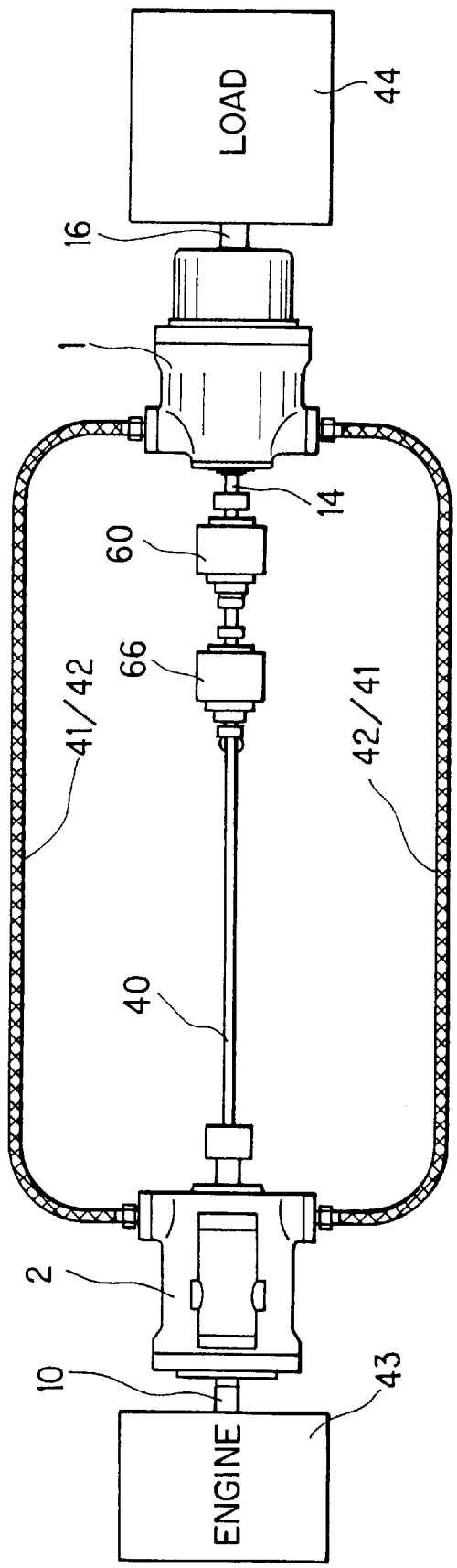
FIG. 2 is a drawing showing the overall construction of this embodiment.
Figure 3:
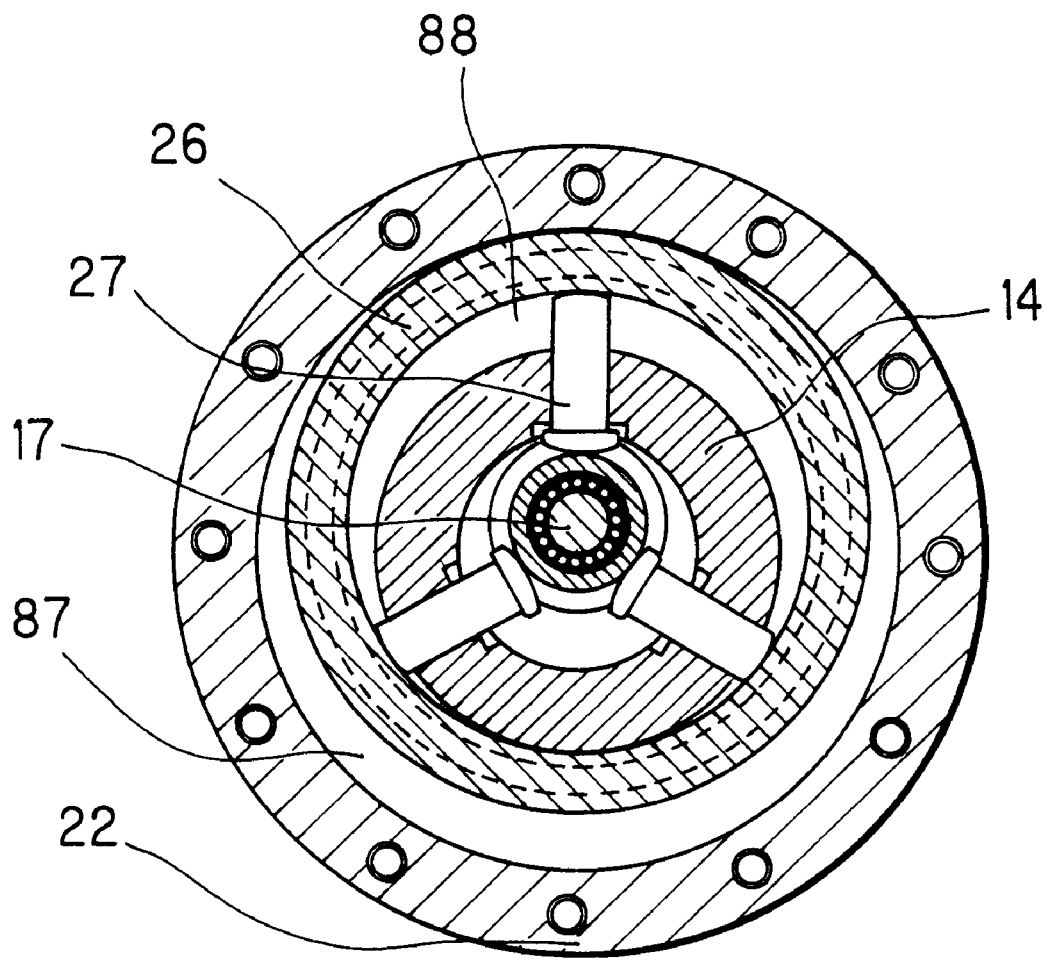
FIG. 3 is a vertical section taken along a line III—III in FIG. 1.

Pipes 41, 42 connected to the ports 85, 86 are also connected to a variable capacity hydraulic pump 2 as shown in FIG. 2 so as to supply and discharge fluid. The variable capacity hydraulic pump 2 is connected to an engine 43 via a shaft 10 and is driven by the rotation of the engine 43. The engine drive shaft 40 is directly joined to the rotating shaft of the hydraulic pump 2, and transmits the rotation to the differential hydraulic motor 1 via the clutch 66.

FIG. 2 shows an example wherein the brake 60 is not built into the casing 73 of the differential hydraulic motor 1, but is installed separately outside it.

A load 44 is connected to the output shaft 16 of the differential hydraulic motor 1, and the load 44 is rotated by the motor rotation.

Next, the operation of this transmission will be described.

Assume that a control pressure of the clutch piston 67 is released so as to disengage the clutch 66. The rotation of the engine drive shaft 40 is then not transmitted to the input shaft 14. Assume also that a control pressure is applied to the piston 62 of the brake 60. The friction plates 64 are thereby pressed together, braking the cylinder block 22 which is restricted by the casing 73.

When a fluid is supplied from the variable capacity hydraulic pump 2, it passes through the ports 85, 86 in the port block 28 so that a high pressure acts on the outer chamber 87 and a low pressure acts on the inner chamber 88 of the change-over valve 26. The piston 30 is pushed out due to high pressure fluid flowing into the cylinder from the port 23 connected to the chamber on the side to which high pressure is supplied. Fluid is discharged from the port 23 connected to the chamber on the low pressure side so that the piston 30 contracts. As the cylinder block 22 is fixed, the swash plate 53 rotates due to the force of the extending piston 30, and the output shaft 16 rotates as one unit.

Due to the rotation of the output shaft 16, the eccentric shaft 17 also rotates. The change-over valve 26 therefore swings, and changes over so that a high pressure is supplied to the piston 30 which is progressively extending while the piston 30 which is contracting is connected to the low pressure side. The output shaft 16 therefore rotates continuously.

The rotation speed nH of this output shaft 16 is directly proportional to the fluid flowrate supplied by the variable capacity hydraulic pump 2, and increases the higher the flowrate. The rotation speed also decreases when the supply flowrate falls, and when the flowrate is zero, rotation stops.

When the direction of fluid supply is reversed, the pressure relationship of the ports 85, 86 is reversed, so whichever of the outer chamber 87,88 was at high pressure changes to low pressure and the low pressure side changes to high pressure. The component force in the rotation direction acting on the swash plate 53 from the piston 30 is therefore reversed, the swash plate rotates in the reverse direction, and the output shaft 16 rotates in the reverse direction.

Figure 11:
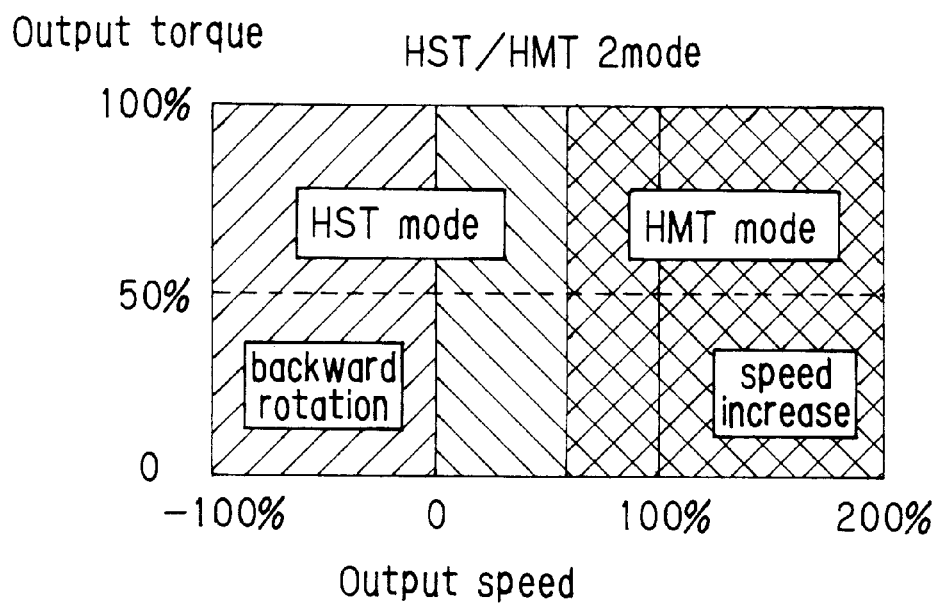
FIG. 11 is a descriptive drawing showing the usage range of each mode of a combined mode hydrostatic transmission according to this invention.
Figure 12:
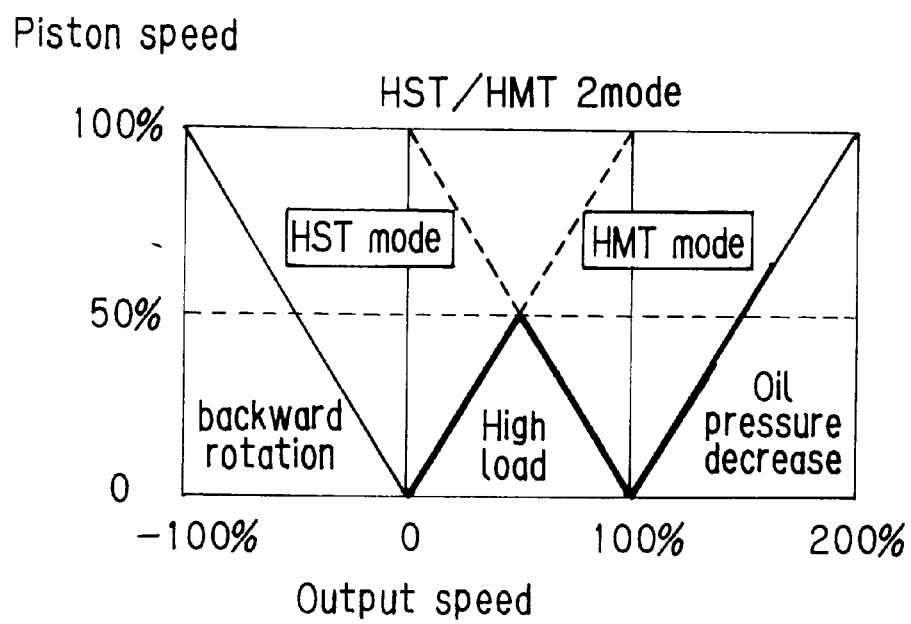
FIG. 12 is a descriptive drawing showing the relation between the output rotation speed and piston speed in each mode of the combined mode hydrostatic transmission according to this invention.

These functions are equivalent to those of HST (see FIG. 11, FIG. 12).

Next, the control pressure of the brake 60 is released, and the cylinder block 22 is freed from its restriction by the casing 73. At the same time, the control pressure is applied to the clutch 66 so as to bring the friction plates 69 into contact and establish a clutch connection.

In this state, the cylinder block 22 rotates at the same speed nX as that of the engine drive shaft 40. When a fluid is supplied from the variable capacity hydraulic pump 2, as the ports 85, 86 are constantly connected to the ports 87A, 88A on the rotating input shaft side via the port block 28, the outer chamber 87 and inner chamber 88 are connected to high pressure and low pressure, the piston 30 is pushed out as described above, and the swash plate 53 rotates.

The output shaft 16 which rotates together with the swash plate 53 therefore rotates at a higher speed which is the sum of the rotation speed nX of the input shaft 14 and a rotation speed nH depending on the flowrate from the hydraulic pump. In other words, the rotation speed nY of the output shaft 16, is given by a nY=nX+nH, where nH is the speed due to oil pressure power and nX is the speed due to mechanical power. In the medium and high speed rotation region, the transmission has equivalent functions to those of HMT (see FIG. 11, FIG. 12).

In this case, regarding transmission efficiency of power, when the input rotation speed nX and output rotation speed nY are identical, i.e. nH is zero, and the piston 30 is at rest, all the power is transmitted mechanically, so the transmission efficiency is a very high value which is effectively identical to that of HMT. Even when nH is not zero, i.e. when the rotation speed is higher, nY=nH+nX, a higher transmission efficiency can be maintained than when rotation is performed at nH alone.

When fluid is supplied in the reverse direction by the variable capacity hydraulic pump 2, the output shaft 16 rotates at a speed obtained by subtracting the rotation speed of the swash plate 53 from that of the cylinder block 22, which has the same rotation as that of the engine drive shaft 40. In other words, the output shaft 16 rotates at a lower speed than that of the engine drive shaft 40. It may be noted that when the cylinder block 22 is rotated in the reverse direction at a rotation speed nH which is equal to the rotation speed nH of the input shaft 14, the rotation of the output shaft 16 stops.

When the brake 60 is released, i.e. when the clutch 66 is disengaged, the cylinder block 22 is no longer restricted by the casing 73 and engine drive shaft 40 and is free. In this case, even when fluid is supplied by the variable capacity hydraulic pump 2, as the rotation reaction cannot be absorbed by the cylinder block 22, a rotation drive force cannot be given to the swash plate 53. The output shaft 16 and the cylinder block 22 are therefore free. Specifically, the output shaft 16 is in a free-wheeling state wherein it is supported free to rotate by the bearings 90, 91, 92, 93, so drive force is not transmitted. In practice, rotation may stop, or there may be forward and backward rotation due to an external force. In general, the noise of the differential oil pressure motor 1 is related to oil pressure, piston speed and change-over speed of the change-over valve. Pressure rise and high output rotation speed tend to aggravate the conditions for generating noise.

However, according to this invention, the output rotation speed nY is the sum of the rotation speed nH due to oil pressure and the mechanical rotation speed nX from the engine. The piston speed and change-over speed of the change-over valve 26 which are directly related to noise, are directly proportional to a rotation speed $\Delta n$ obtained by subtracting nX from the output rotation speed nY, i.e. $\Delta n=(nY-nX)$. When nY=nX, $\Delta n=0$, the piston 30 stops, and almost no noise is generated in the vicinity of this rotation region. Also, in the high speed rotation region, $\Delta n<nY$, so noise is less than for HST operating at the same speed.

Figure 4:
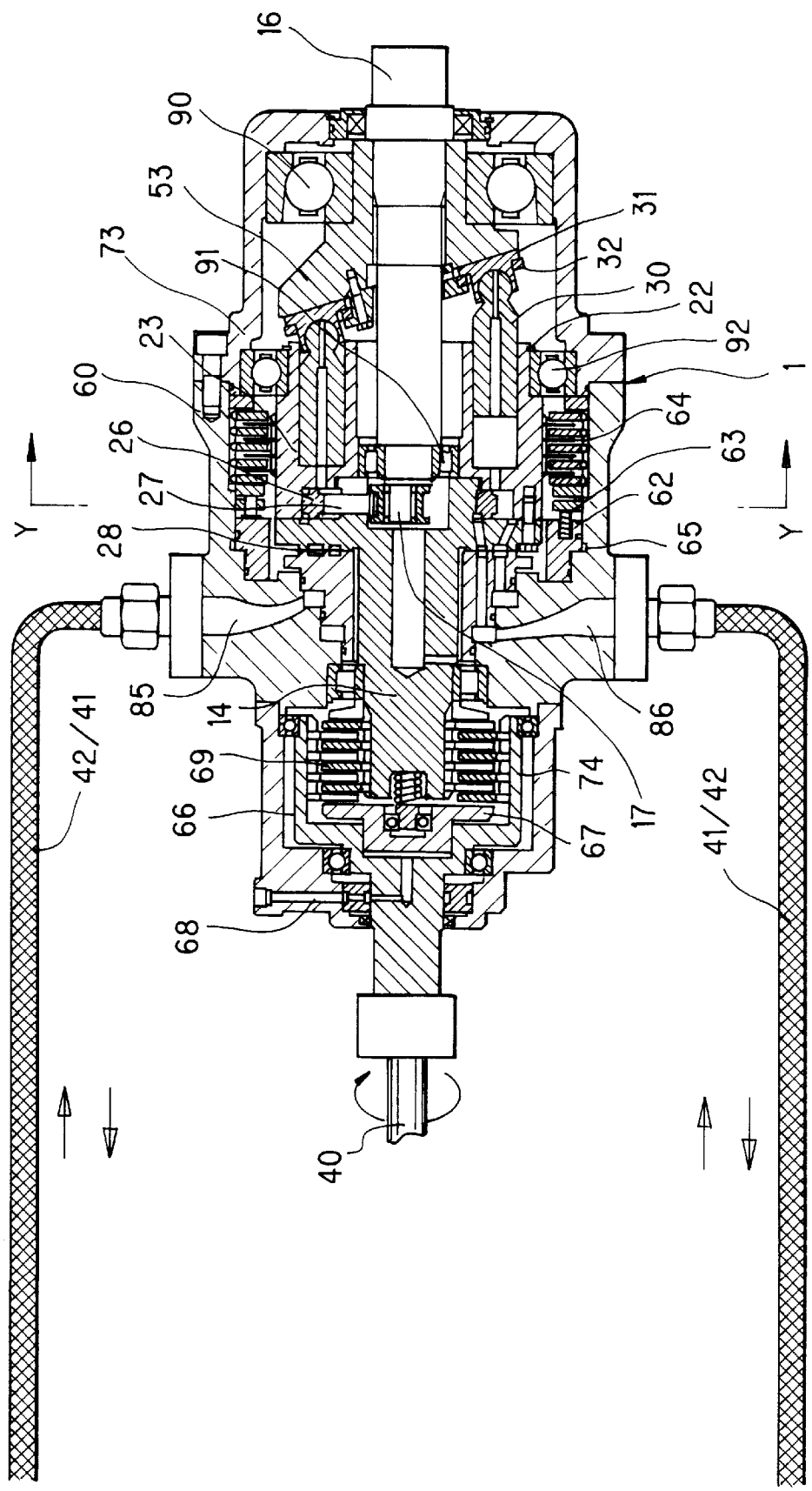
FIG. 4 is a view in vertical section of a differential hydraulic motor according to a second embodiment of this invention.
Figure 5:
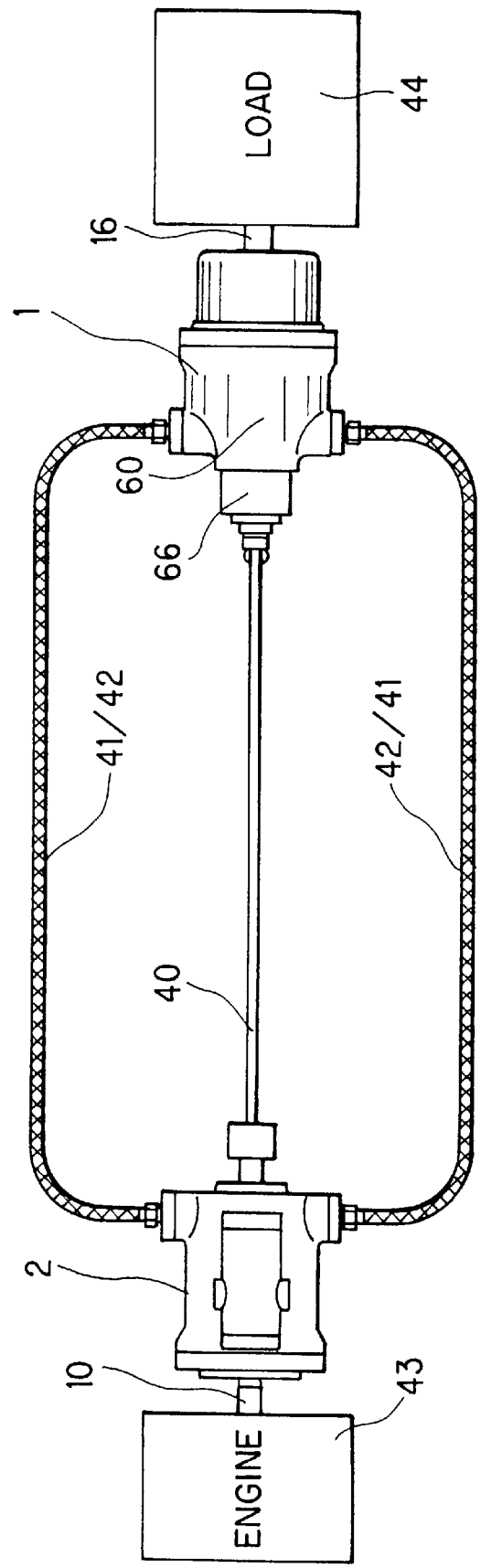
FIG. 5 is a drawing showing the overall construction of this embodiment.

FIG. 4 and FIG. 5 show other embodiments where the clutch 66 is built into the casing 73.

The friction plates 69 are spline-jointed on the outer circumference of the input shaft 14. The friction plates 69 are also spline-jointed on the inner circumference of a drum 74 connected to the engine drive shaft 40. When a control pressure is introduced from the port 68, the piston 67 presses these friction plates 69 together so as to connect the clutch, conversely when the control pressure is released, the friction plates 69 separate due to a return spring and the clutch is disengaged.

The clutch 66 and brake 60 are thereby assembled in a one-piece construction inside the differential oil pressure motor 1, thus simplifying the structure and increasing the degree of freedom of design.

Figure 6:
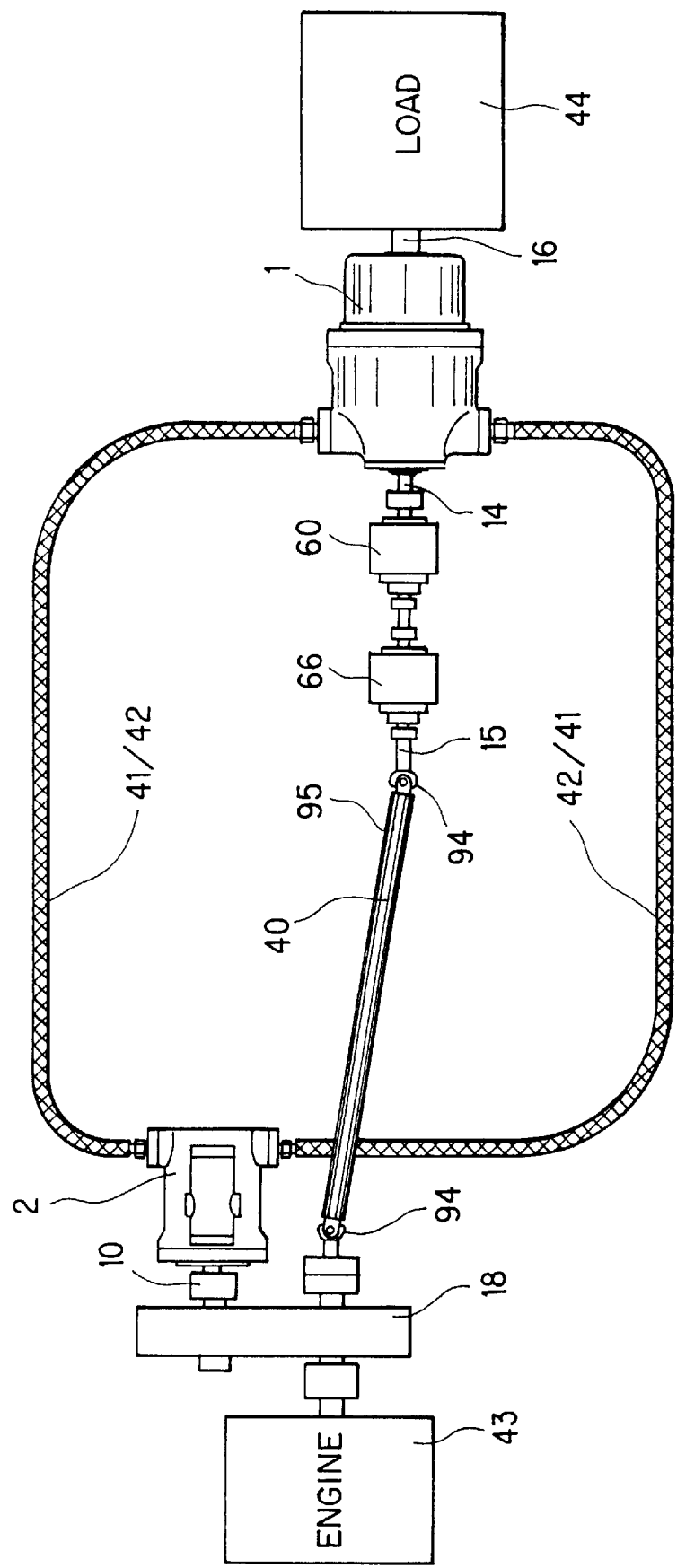
FIG. 6 is a drawing showing a different overall construction.
Figure 7:
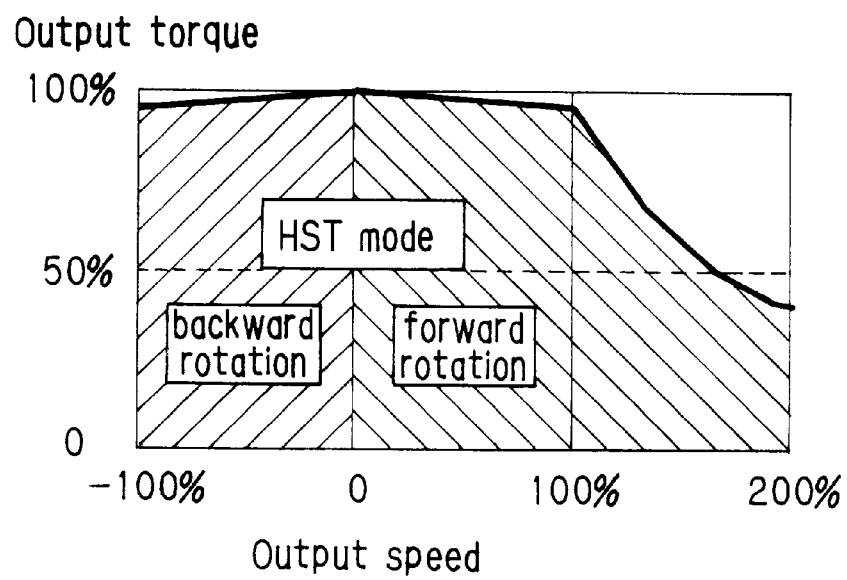
FIG. 7 is a descriptive drawing showing the output rotation speed and output torque usage range of a HST.
Figure 8:
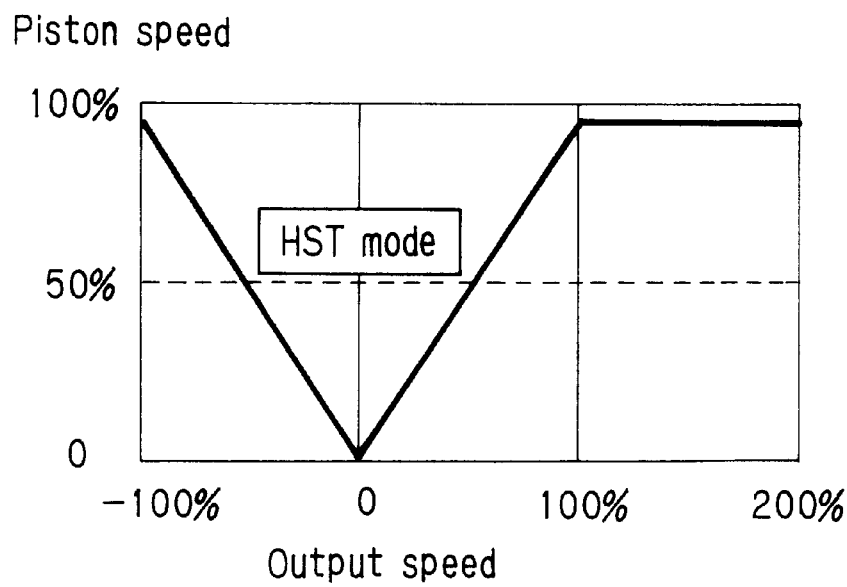
FIG. 8 is a descriptive drawing showing a relation between the output rotation speed and piston speed of a HST.
Figure 9:
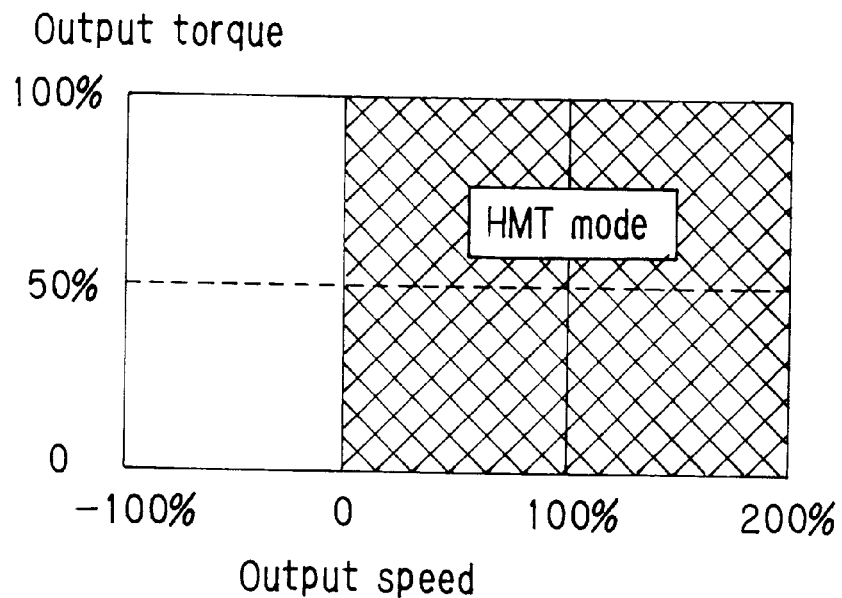
FIG. 9 is a descriptive drawing showing the output rotation speed and output torque usage range of a HMT.
Figure 10:
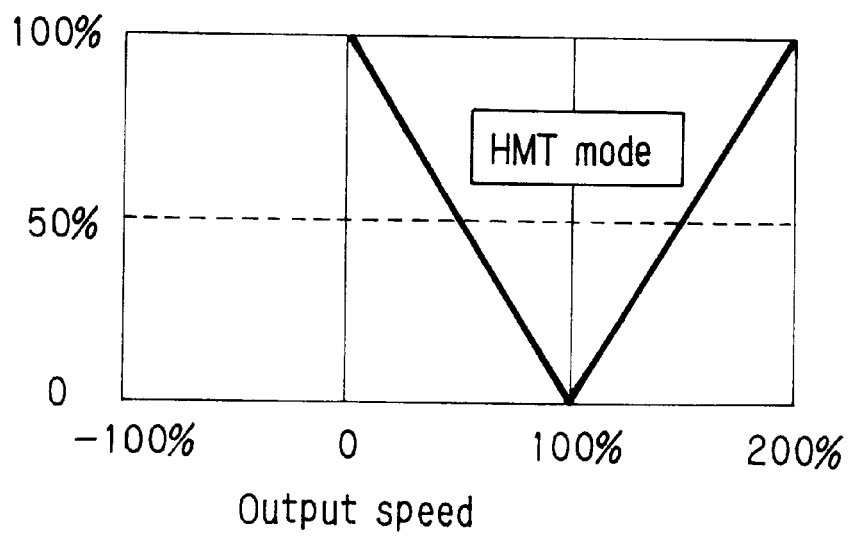
FIG. 10 is a descriptive drawing showing a relation between the output rotation speed and piston speed of a HMT.

A further embodiment will now be described with reference to FIG. 6.

According to this embodiment, the engine drive shaft 40 from the engine 43 is an extensible shaft 95 comprising two shafts which have been coaxially spline-jointed together. The length of the shaft 95 may be freely adjusted in the axial direction, and the two ends of the shaft 95 are respectively connected to the engine 43 and the input shaft 15 of the clutch 66 via free joints 94. Further, the variable capacity hydraulic pump 2 is not directly linked to the engine 43, but is connected in parallel with the engine drive shaft 40 via a reducing gear mechanism 18.

If this arrangement is used, the variable capacity hydraulic pump 2 may be an external pump, and by connecting the pump to the differential hydraulic motor 1 via the pipes 41, 42, the degree of freedom in the relative positions of these components is enhanced. Moreover, as the engine 43 and differential hydraulic motor 1 are connected by the extensible drive shaft 95 and free joints 94, they are not necessarily situated on the same rotation axis, and may be moved closer together or further apart.

What is claimed:

1. A combined mode hydrostatic transmission comprising a differential hydraulic motor and a variable capacity hydraulic pump driven by an engine having a drive shaft for supplying pressurized oil to said motor, said motor comprising:

a swash plate supported free to rotate;

an output shaft fixed to said swash plate;

a cylinder block free to rotate coaxially with said swash plate;

an input shaft fixed to said cylinder block;

a piston housed in said cylinder block for rotating said swash plate relative to said cylinder block according to a pressure of said pressurized oil exerted thereon;

a change-over valve which exerts the pressure of said pressurized oil to said piston according to a relative rotation of said cylinder block and said swash plate;

a clutch for selectively interrupting transmission of rotation from said drive shaft to said input shaft; and a brake for selectively restricting or fixing the rotation of said cylinder block.

2. A combined mode hydrostatic transmission as defined in claim 1, wherein said cylinder block is housed in a casing and said brake comprises a plurality of friction plates connected to the inner circumference of said casing, a plurality of friction plates connected to the outer circumference of said cylinder block, and a piston which presses said friction plates together according to a control pressure.

3. A combined mode hydrostatic transmission as defined in claim 1, wherein said clutch comprises a plurality of friction plates connected to said drive shaft, a plurality of friction plates connected to said input shaft, and a piston which presses these friction plates together according to a control pressure.

4. A combined mode hydrostatic transmission as defined in claim 1, wherein said cylinder block is housed in a casing and said clutch is built onto said casing.

5. A combined mode hydrostatic transmission as defined in claim 1, wherein said drive shaft is connected to said clutch via an extensible shaft which may be freely lengthened or shorted in the axial direction, but fixed in the direction of rotation and free joints are disposed at the ends of said extensible shaft.

6. A combined mode hydrostatic transmission as defined in claim 1, wherein said motor comprises a plurality of pistons for rotating said swash plate relative to said cylinder block, said pistons being arranged along a circle and housed in said cylinder block.

7. A combined mode hydrostatic transmission as defined in claim 6, wherein an end of said output shaft is inserted in said cylinder block and said change-over valve comprises a ring supported eccentrically on said end, wherein an outer circumference of said ring is in contact with an inner circumference of said cylinder block, forming an inner chamber within said ring and an outer chamber between said ring and said cylinder block, and the pressure of said pressurized oil if selectively exerted on said pistons according to a relative rotation position of said cylinder block and said swash plate via either of said inner and outer chambers.

* * * * *